(No Model.) 3 Sheets—Sheet 3.
A. N. CONNETT & J. S. DETRICK.
CURRENT COLLECTOR FOR ELECTRIC RAILWAYS.
No. 560,894. Patented May 26, 1896.
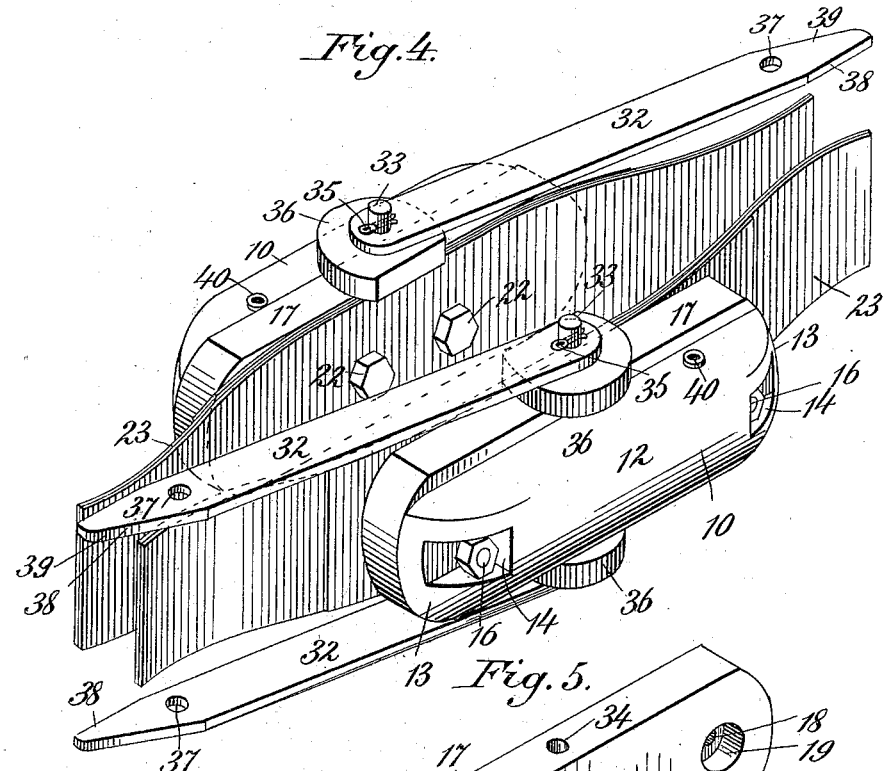
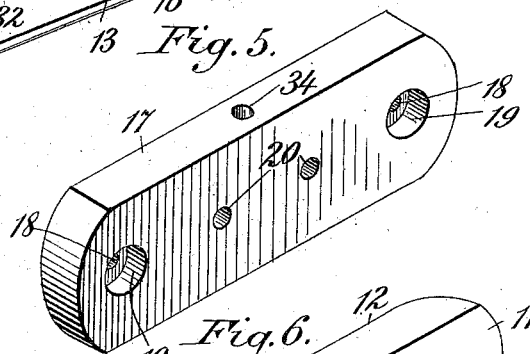
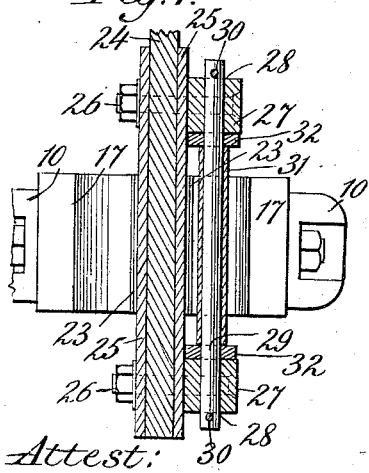
Attest:
H. H. Schott
P. H. Libbey
Inventors
Albert N. Connett
Jacob S. Detrick
By Jennie V. Goldsborough
Attys.

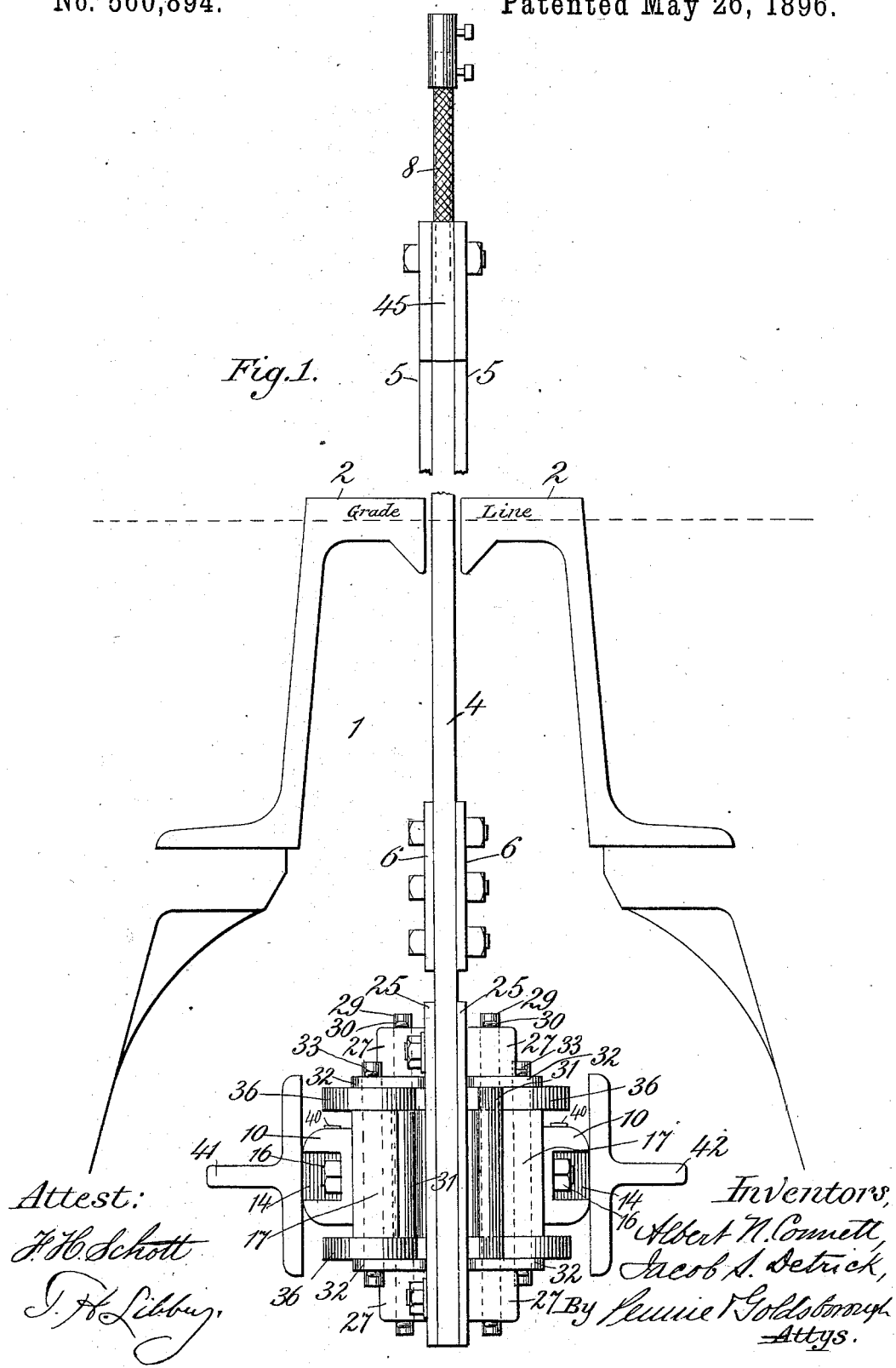

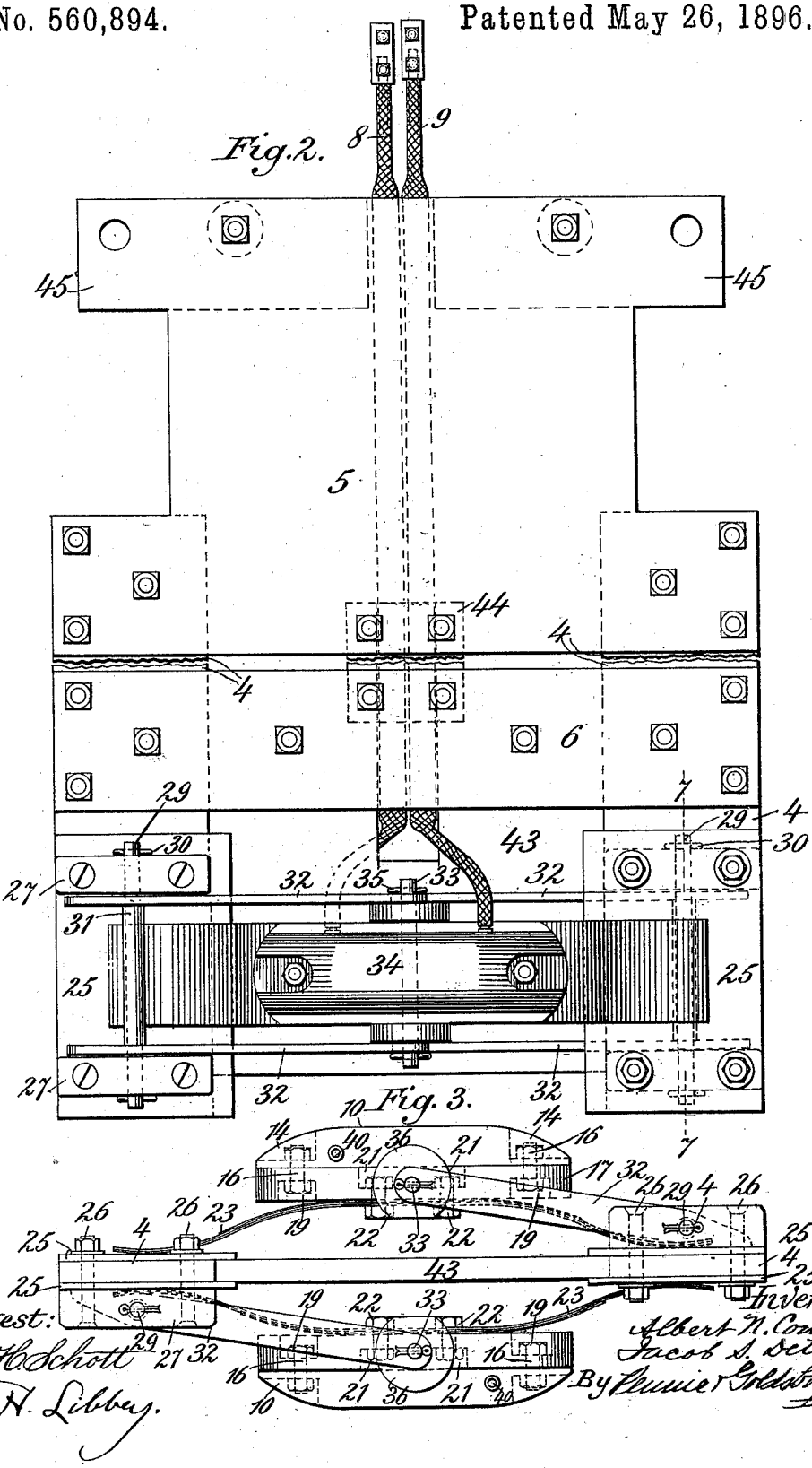

UNITED STATES PATENT OFFICE.

ALBERT N. CONNETT, OF WASHINGTON, DISTRICT OF COLUMBIA, AND JACOB STOLL DETRICK, OF BALTIMORE, MARYLAND; SAID DETRICK ASSIGNOR TO SAID CONNETT.

CURRENT-COLLECTOR FOR ELECTRIC RAILWAYS.

SPECIFICATION forming part of Letters Patent No. 560,894, dated May 26, 1896.

Application filed January 17, 1896. Serial No. 575,910. (No model.)

*To all whom it may concern:*

Be it known that we, ALBERT N. CONNETT, residing at Washington, in the District of Columbia, and JACOB STOLL DETRICK, residing at Baltimore, in the State of Maryland, citizens of the United States, have invented certain new and useful Improvements in Current-Collectors for Electric Railways; and we do hereby declare the following to be a full, clear, and exact description of the invention, such as will enable others skilled in the art to which it appertains to make and use the same.

Our invention relates to electric railways, and more particularly to an improved traveling contact or current-collector, designed for use with underground or conduit systems.

In the accompanying drawings, Figure 1 represents an end elevation of a contact device embodying our improvements in position in a conduit between two stationary current-supply conductors. Fig. 2 represents a side elevation of the same with the conduit and conduit-conductors omitted. Fig. 3 represents a plan view of the same without its suspending devices. Fig. 4 represents in perspective the contact-shoes, their insulating-blocks, springs, and supporting-links detached from the central suspending-apron. Figs. 5 and 6 represent, respectively, in perspective one of the insulating-blocks and one of the contact-shoes detached; and Fig. 7 represents a vertical section on the line 7 7 of Fig. 2.

Similar numerals of reference indicate similar parts throughout the several views.

Referring to the drawings, 1 indicates the interior of the conduit system, and 2 the slot-rails thereof. The motor connections or leads 8 9 from the car may conveniently pass between the plates 5, located above the conduit, and between the plates 6 within its interior, each pair of said plates being spaced apart by the shank-plates 4, so as to permit the passage of the said connections 8 9, while at the same time protecting them from injury. The plates 4 serve also as means for supporting the plates 6 from the plates 5. At their upper portion the separation of the plates 5 is maintained by the filling-pieces 45, and below, to prevent short circuits, a strip 43 of insulation is inserted. A further connection between the plates 5 and 6 is afforded by the metallic plates 44, rabbeted to inclose the leads 8 and 9, which are thus protected from injury in their passage through the conduit-slot. The motor connections 8 9 lead, respectively, to contact-shoes 10, each of which consists of a block of metal or other conducting material, having, preferably, a flat inner face 11 and an outer bearing-face 12, rounded or beveled at its front and rear ends 13, and provided with recesses 14 and bolt-holes 15 to receive bolts 16, which secure the shoes to insulating-blocks 17. Each of these blocks is provided near its ends with bolt-holes 18, communicating with recesses 19 on the inner face of the block to receive the heads of the bolts 16, the heads of these bolts 16 being thus countersunk within the recesses 19. Each block is likewise provided at about its center with a pair of bolt-holes 20, opening into a recess 21, to receive bolts 22 for securing springs 23 to the blocks. These springs are preferably single-leaf springs of the semi-elliptical form shown, and their characteristic feature is that they do not themselves support the contact-shoes, but serve merely as a resilient intermedium for insuring the proper contact thereof with the current-supply bars or conductors. To this end they are attached midway of their length to the blocks 17, and their free extremities have a sliding bearing upon plates 25 of insulating material bolted to the shank-plates 4. As the springs do not have imposed upon them the work of supporting the shoes, they are found in practice to be particularly responsive to the function which they are designed to subserve—to wit, to maintain a practically constant, light, and even pressure of the shoes against the conductor-bars. Relieved of the weight of the shoes, their operation is independent thereof, and they may be so established as to exert with practical accuracy the normal contact-pressure desired without having such excess of tension as would cause rapid wear of the contact-surfaces and without having such weight as would make them sluggish in action. The means for thus supporting the shoes independently of the springs consist of links 32, the inner ends of which are perforated to receive the ends of pivot-pins 33, passing through vertical openings 34 in the respective insulating-blocks 17 and held by cotters 35. Washers of insulating material 36 are arranged between the blocks 17 and links 32, as shown. It will be observed that the pairs of links are oppositely disposed, and their outer ends are provided with openings 37 to receive pivot-rods 29, held in place by cotters 30 and each provided with a loose sleeve 31, said pivot-rods having their bearings within the bearing-blocks of insulating material 27, secured to the plates 25 by the same bolts 26 which secure the plates to the shank 4. The rods 29 pass loosely through the apertures in the ends of the links 32, and the inner ends of the links are extended beyond their pivotal connection and are beveled on their inner edges 38, these extensions having the function of limiting the possible outward throw of the contact-shoes, so that when (as in crossing an intersecting cable-conduit) the straight continuity of the supply-bars 41 42 is interrupted the springs shall be prevented from throwing the shoes out beyond the limited distance permitted by the extensions. Consequently when the shoes pass a gap in the supply-conductors they will be nevertheless within the proper range of movement and will immediately glide into easy contact with conductors beyond the gap and without danger of being thrown outside of the line of the supply-bars, so as to be destroyed. The shoes 10 are each provided at opposite ends of either their upper or lower sides with an aperture 40 to receive the motor-conductors 8 and 9, said conductors diverging at their lower ends, as shown in Fig. 2, so that each shoe is in electrical and mechanical connection with one of said conductors.

The operation and utility of the construction thus described will be apparent to those skilled in the art.

The stationary conductors 41 and 42 are shown in Fig. 1 arranged in parallel relation within the conduit, and are in electrical connection with the opposite poles of a supply source. The electric current passes from one of said conductors through the shoe contacting therewith, thence through one of the motor-conductors 8 9 to the motor upon the car, returning through the other motor-conductor and shoe to the opposite conduit-conductor in the usual manner.

It is obvious that by the use of our improved supporting devices for the shoes and insulating-blocks the springs 23 are permitted a free endwise longitudinal movement when compressed as well as a laterally-yielding movement. Thus undue wear and strain upon the springs are avoided and an effective and constant contact between the traveling shoes and conduit-conductors is insured.

Having thus described our invention, what we claim is—

1. A traveling contact or current-collector for electric railways, comprising a pair of contact-shoes, springs for holding the shoes in yielding contact with the supply-conductors, and pivoted supports for the shoes independent of the springs, said supports being arranged in pairs each pair consisting of an upper and a lower link between which the corresponding shoe is mounted, and the two pairs being so arranged as to bring the shoes opposite each other; substantially as described.

2. A traveling contact or current-collector for electric railways, comprising a pair of contact-shoes, springs for holding the shoes in yielding contact with the supply-conductors, and pivoted supports for the shoes independent of the springs said supports extending in reverse directions from fixed pivotal points to bring the shoes opposite each other; substantially as described.

3. A traveling contact or current-collector for electric railways, comprising a pair of contact-shoes, springs for holding the shoes in yielding contact with the supply-conductors, supports for the shoes independent of the springs, said supports extending in reverse directions from fixed pivotal points to bring the shoes opposite each other and means for limiting the possible outward swing of the shoes; substantially as described.

4. A traveling contact or current-collector for electric railways, comprising a pair of contact-shoes, springs for holding the shoes in yielding contact with the supply-conductors, and pivoted links upon which the shoes are mounted said links extending in reverse directions from fixed pivotal points to bring the shoes opposite each other; substantially as described.

5. A traveling contact or current-collector for electric railways, comprising a pair of contact-shoes, springs for holding the shoes in yielding contact with the supply-conductors, and pivoted links upon which the shoes are mounted, said links being prolonged beyond their pivotal supports to form backstops limiting the outward swing of the shoes; substantially as described.

6. A traveling contact or current-collector for electric railways, comprising a pair of contact-shoes, springs for holding the shoes in yielding contact with the supply-conductors, and pivoted links upon which the shoes are mounted, said links extending in reverse directions from fixed pivotal points to bring the shoes opposite each other, and said shoes being themselves mounted pivotally upon the links; substantially as described.

7. A traveling contact or current-collector for electric railways, comprising a pair of contact-shoes, and semielliptical springs connected centrally to the shoes and having free ends in sliding contact with the hanger; substantially as described.

8. A traveling contact or current-collector for electric railways, comprising a hanger, shoes supported upon opposite sides thereof, springs for holding the shoes in yielding contact with the supply-conductors, and links for supporting the shoes, the links for one shoe being connected to one end of the hanger, and the links for the other shoe being connected to the opposite end of the hanger; substantially as described.

9. A traveling contact or current-collector for electric railways, provided with contact-shoes, each shoe having a backing of insulating material bolted thereto, a semielliptical spring connected centrally to the backing and having free ends, and a pair of links between which the shoe is located, and a pivot-pin passing through the backing and upon which the links are mounted; substantially as described.

10. A traveling contact or current-collector for electric railways, comprising a pair of insulating-blocks, a contact-shoe secured to each of said blocks, means for supporting and suspending said blocks, and springs arranged between the blocks and adapted to yield both laterally and longitudinally; substantially as described.

11. A traveling contact or current-collector for electric railways, comprising insulated contact-shoes, a hanger from which the shoes are pivotally suspended, and springs interposed between the shoes and hanger, and adapted to move both laterally and longitudinally; substantially as described.

12. A traveling contact or current-collector for electric railways, comprising a hanger, oppositely-disposed pairs of links pivotally secured to the hanger at their inner ends, and to oppositely-arranged insulating-blocks at their outer ends, contact-shoes secured to the outer sides of the blocks, and springs secured to the inner sides of the blocks and having free ends bearing upon the hanger and adapted to slide thereon when the springs are compressed; substantially as described.

13. The combination with a suspended hanger, contact-shoes, and springs, of connecting-links pivotally secured at their outer ends to the shoes, and pivotally supported at their inner ends by fixed bearing-blocks and pivot-rods said links extending in reverse directions from their fixed pivotal points to bring the shoes opposite each other; substantially as described.

14. The combination with the hanger, insulating-blocks, contact-shoes, and springs, of pivotally-secured links, the inner ends of which are continued beyond the fulcrum upon which the links are pivoted; substantially as described.

15. The combination with the hanger, the yielding shoes, and insulating-blocks, of the pivoted links, bearing-blocks projecting from the hanger, pivot-rods, and sleeves loosely encircling said rods; substantially as described.

In testimony whereof we affix our signatures in presence of two witnesses.

ALBERT N. CONNETT.
JACOB STOLL DETRICK.

Witnesses:
HUGH M. STERLING,
JOHN C. PENNIE.